United States Patent [19]

Perrault et al.

[11] Patent Number: 5,393,020
[45] Date of Patent: Feb. 28, 1995

[54] COMPACT WIREWAY ARRANGEMENT FOR SHIPS

[76] Inventors: Raymond E. Perrault, 3845 Crest Rd., Rancho Palos Verde, Calif. 90274; Frederick Perrault, 1727 Date Ave., Torrance, Calif. 90503

[21] Appl. No.: 147,334

[22] Filed: Nov. 3, 1993

[51] Int. Cl.⁶ .................................................. F16L 3/22
[52] U.S. Cl. ........................................ 248/68.1; 248/70
[58] Field of Search .................... 248/49, 68.1, 65, 72, 248/70; 174/68.2, 48, 97

[56] References Cited

U.S. PATENT DOCUMENTS

| | | | |
|---|---|---|---|
| 2,217,533 | 10/1940 | Wokarsky | 248/333 |
| 2,670,917 | 12/1952 | Hoffman | 258/57 |
| 3,334,581 | 7/1966 | Cassidy et al. | 248/63 |
| 3,355,132 | 11/1967 | Jenkins | 248/59 |
| 3,495,796 | 2/1970 | Fruh | 248/327 |
| 3,674,233 | 7/1972 | Van Buren, Jr. | 248/68.1 |
| 3,787,016 | 1/1974 | Laval, Jr. | 248/49 |
| 3,923,277 | 12/1975 | Perrault et al. | 248/49 |
| 4,960,253 | 10/1990 | Perrault et al. | 248/68 |
| 5,118,066 | 6/1992 | Perrault et al. | 248/333 |

*Primary Examiner*—Ramon O. Ramirez
*Attorney, Agent, or Firm*—Poms, Smith, Lande & Rose

[57] ABSTRACT

A wireway system is provided which includes a channel-shaped member having a central portion from which project two parallel, relatively narrow flanges. One of the flanges includes wider end portions which overlie two downcomers to which they are secured by fasteners. Cables or the like are supported on the central portion of the wireway. The relatively narrow flanges provide improved strength at reduced weight and permit adjacent wireways to be closely spaced apart.

8 Claims, 1 Drawing Sheet

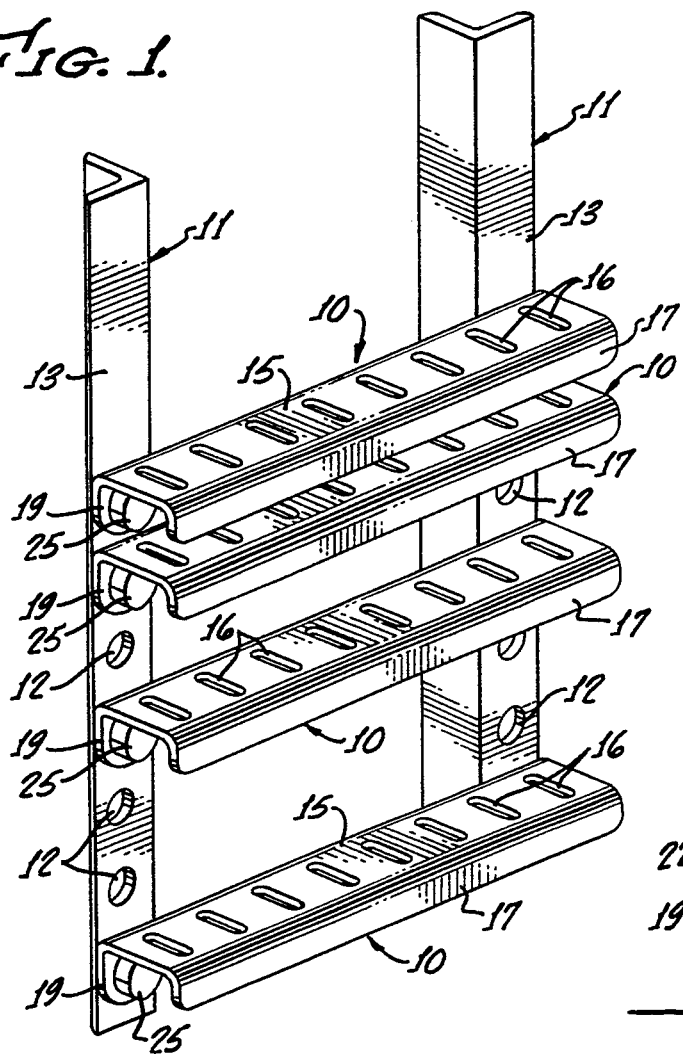
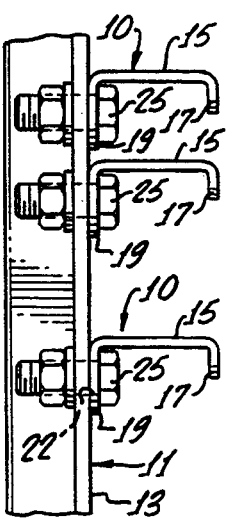
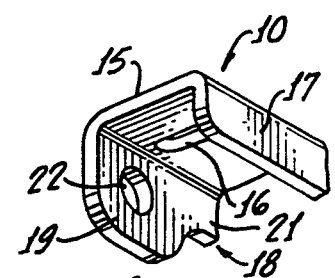
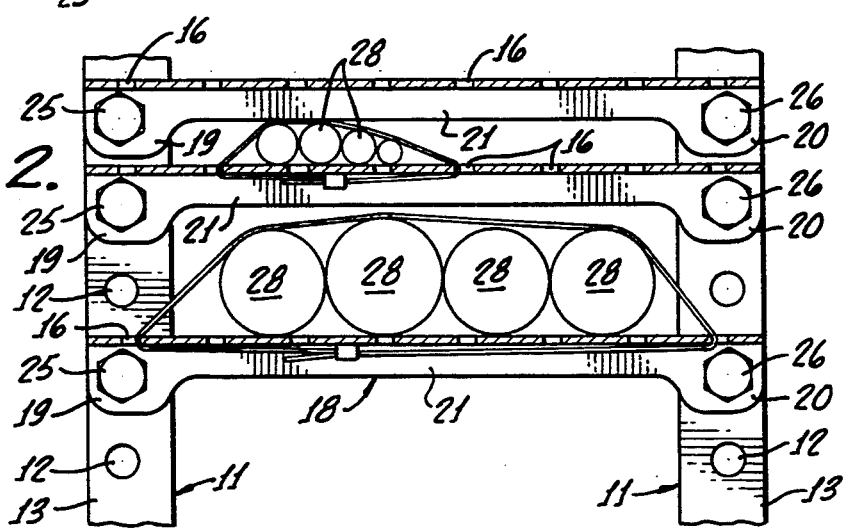

COMPACT WIREWAY ARRANGEMENT FOR SHIPS

BACKGROUND OF THE INVENTION

In the construction of ships, it is common to provide wireways which support electrical cables or other objects in the ship's operative systems.

DESCRIPTION OF THE PRIOR ART

In a wireway arrangement commonly used, a pair of downcomers projects in a parallel relationship from a deck above or from a bulkhead, each downcomer being provided with a series of equally spaced openings through it. Wireways are attached to the two downcomers by extending bolts through openings in the wireways which are matched with selected openings in the downcomers. In this manner, the wireways extend between the two downcomers and are attached to both. Electrical cables then pass between the downcomers and are supported on the surfaces of the wireways.

In one design commonly used, the wireway has a relatively wide central flange having end parts which overlie the two downcomers and which are provided with openings to receive the fasteners. At one edge of this central portion, an additional relatively wide flange projects at right angles and is adapted to receive the electrical cables to be supported. Slots permit banding of the cables in their attachments to the downcomer. At the opposite edge of the relatively wide flange is a second and narrower flange extending in the opposite direction from that of the first. The second flange is interrupted at its central portion with a cutout which is for the purpose of permitting an alternate installation where the wireway is mounted on a single downcomer. The cutout permits the flange edges to straddle the opposite sides of the single downcomer and a bolt hole through the relatively wide flange then forms the attachment.

This construction is inherently disadvantageous in that the interruption in the second flange causes it to lose strength so that it has little effect in contributing to the strength and rigidity of the wireway. In addition, the relatively wide central flange occupies an excessive amount of space lengthwise of the downcomers, reducing the space available for the cables to be supported. This necessitates a wide spacing between adjacent wireways with a resulting large overall volume for the wireway system. These wireways must be spaced apart at least two of the openings in the downcomer to provide a clearance at the edge of the relatively wide flange of one wireway with respect to the principal surface of the adjacent wireway. In ships with their massive amounts of electronics, such as navy ships, the space occupied by the wireways results in a substantial penalty in the tight quarters of the ship.

Another prior art wireway is formed as a square tube having its ends rounded inwardly. The banding for the cables goes through the ends of the tubular wireway so that the cables cannot be separated. This form of a wireway is bulky and heavy. It does not permit close spacing and, as with other wireways, requires spacing apart of adjacent wireways by at least two of the openings in the downcomers. Installation is labor intensive.

SUMMARY OF THE INVENTION

The present invention provides an improved wireway which is stronger than those of the prior art, while at the same time permits very close spacing of the wireways to minimize the size of the system for supporting the cables or the like. Weight is minimized. The wireways can be positioned so that they are attached at adjacent openings of the downcomers while still allowing smaller electrical cables to pass between adjacent wireways. This function cannot be achieved in the prior art.

The wireway of this invention has a channel form with a principal elongated portion having a flat surface and provided with a plurality of transverse slots therethrough to allow banding of cables supported on it. Two flanges project in the same direction in a parallel relationship from the central portion of the wireway. One of the flanges is of constant, relatively narrow width throughout its length. The other flange is of a comparable width at its intermediate portion. At the ends, however, this flange is made wider and provided with openings therethrough. These openings are aligned with openings in the downcomers for allowing fasteners to attach the wireways to the downcomers.

The fact that the wireways are shaped as channels with uninterrupted flanges gives them great strength with a minimum of weight. With the flange that attaches to the downcomer being relieved in width intermediate the end portions, a clearance is provided between adjacent wireways even when they are attached at adjacent openings in the downcomers. This allows relatively small cables to pass between the flanges of one wireway and the principal surface of the adjacent wireway. In all instances, the relief provided by the narrower intermediate portion of the flange assures that the wireways may be attached relatively close together- and the cables accommodated with a minimum amount of overall space.

BRIEF DESCRIPTION OF THE DRAWINGS

FIG. 1 is a perspective view of the wireways of this invention attached to a pair of downcomers;

FIG. 2 is a transverse sectional view of the wireways with cables attached to them;

FIG. 3 is an end elevational view of the wireways as attached to the downcomers; and FIG. 4 is a fragmentary perspective view of an end portion of the wireway.

DETAILED DESCRIPTION OF THE INVENTION

The wireways 10 of this invention are illustrated in the drawing as associated with a pair of vertical downcomers 11. In the example given, the latter members are formed as angles with regularly spaced openings 12 in the flanges 13 of the two wireways, these flanges falling in the same plane. The openings 12 are one inch apart. The wireway 10 is equally usable with downcomers of square tubular form or of other shape.

Each wireway 10 includes an elongated principal surface 15 which faces upwardly when the wireway is used with vertical downcomers. Extending through the surface 15 is a series of transverse spaced slots 16.

Depending perpendicularly from one longitudinal edge of the portion 15 of the wireway 10 is a flange 17 which is of uniform width throughout its length. The flange 17 is relatively narrow, preferably having a width which is no more than half the distance between adjacent openings 12 in the downcomers. The flange 17 is spaced away from the downcomers 11 when the wireway is in service.

Opposite from and parallel to the flange 17 and depending from the other longitudinal edge of the portion 15 of the wireway 10 is a second flange 18. This flange has relatively wide portions 19 and 20 at its opposite ends. Intermediate the end portions 19 and 20, the longer central portion 21 of the flange 18 is narrower and of a constant width corresponding to that of the flange 17. Openings 22 extend through the end portions 19 and 20.

As the wireways are used, the flange 18 is placed adjacent the flanges 13 of the downcomers with the end portions 19 and 20 overlying the downcomer flanges. The openings 22 in the wireway 10 are aligned with a selected pair of opposite openings 12 in the downcomers. Bolts 25 and 26 extend through the openings 12 of the downcomers, and 22 of the end portions 19 and 20, securing the wireways to the downcomers. The electrical cables 28 of the ship's system extend over the various wireways transversely to the portion 15. A strap 29 is wrapped around the electrical cables and extends through selected ones of the slots 16 of the wireways to hold the cables to the wireways. This provides a secure attachment and enables varying numbers of cables to be attached to each wireway. Cables of opposite polarity may be spaced apart by banding through different slots 16.

The wireway 10 of this invention is particularly strong and rigid by virtue of the flanges 17 and 18 at the opposite longitudinal edges of the central portion 15. This gives the wireway 10 a channel configuration. Both flanges 17 and 18 are continuous with no interruptions, as in some prior art designs, to detract from strength and rigidity.

An additional advantage of this invention is that it permits the wireways to be closely spaced so that they efficiently accommodate the cables of the ship's electrical system with a minimum of space and weight. The end portions 19 and 20 of the flange 18 are dimensioned so as to permit two wireways 10 to be attached by bolts through adjacent openings 12 and the flanges 13 of the downcomers 11. This is illustrated for the topmost two wireways 10 in FIG. 2. This close spacing is useful when the cables 23 are of relatively small diameter. The central portion 21 of the flange 18 provides a relief allowing the small cables 28 to pass beneath the flange 18 and above the central portion 15 of the adjacent wireway. Conventional wireways will not permit such spacing so that the system becomes much larger than it is with the wireway of this invention.

The relatively narrow flanges 17 and 18 result in a maximum spacing between adjacent wireways, which allows cables of larger sizes to be accommodated in a minimum overall volume. The wireways need not be separated as far apart along the downcomers to provide adequate spacing to receive the cables.

The foregoing detailed description is to be clearly understood as given by way of illustration and example only, the spirit and scope of this invention being limited solely by the appended claims.

What is claimed is:

1. A wireway for accommodating electrical cables in a ship comprising a member having an elongated central portion, said central portion having a plurality of transverse slots therethrough, a first flange having a width and projecting in one direction from one longitudinal edge of said central portion and substantially perpendicular thereto, a second flange having a width and projecting in the same direction from the opposite longitudinal edge of said central portion, said second flange being opposite from and substantially parallel to said first flange, said second flange having a central portion of relatively narrow width and having relatively wide end portions thereby to provide a relief intermediate said end portions for the transmission of electrical cables, said end portions being provided with apertures therethrough for receiving fasteners for attaching said member to a pair of downcomers.

2. A device as recited in claim 1 in which said central portion of said second flange is substantially equal in width to that of said first flange.

3. In combination with a pair of downcomers in a ship arranged in a parallel relationship, each provided with a plurality of spaced openings therethrough, a cable supporting arrangement comprising a plurality of wireways, each of said wireways comprising a channel-shaped member having an elongated central portion providing a principal surface for supporting a cable and having a plurality of transverse slots therethrough, and a duality of flanges projecting in the same direction from said central portion, said flanges being oppositely arranged and substantially parallel, one of said duality of flanges being of substantially constant width throughout the length thereof, the other of said duality of flanges being of substantially constant width throughout the central portion thereof and having end portions which are wider than said central portion thereof, said end portions being provided with apertures therethrough, each of said apertures in said end portions being aligned with one of said apertures in one of said downcomers, and a fastener extending through each of said aligned apertures for holding said wireways to said downcomers, said central portion of said other flange providing a relief between said wider end portions; whereby plural of said wireways can be closely spaced along said pair of downcomers while nevertheless providing a clearance between said duality of flanges of one of said wireways and said principal surface of a next lower one of said plural wireways for permitting the passage of electrical cables or the like therebetween.

4. A device as recited in claim 3 in which the width of said one flange and the width of said central portion of said other flange is no more than half of the distance between adjacent openings in each of said downcomers.

5. A device as recited in claim 4 in which two adjacent channel-shaped members are so held to said downcomers at two adjacent ones of said openings through said downcomers.

6. A device as recited in claim 4 in which the width of said central portion of said other flange is substantially equal to the width of said one flange.

7. A device as recited in claim 3 in which said elongated central portion of said channel-shaped member is provided with a plurality of transverse slots therethrough for receiving banding for holding cables to said central portion of said channel-shaped member.

8. The method of supporting at least one relatively small electrical cable or the like in a ship comprising extending a duality of downcomers in parallel relationship, providing a series of equally spaced openings through each of said downcomers, providing at least two wireways of substantially identical construction, each of said wireways being formed with a central elongated portion and with a duality of flanges projecting in one direction therefrom so as to provide said wireway with a channel configuration, one of said flanges being made of substantially constant width, the other of said flanges being made to have an intermediate portion of a width substantially equal to that of said first-mentioned flange and provided with wider end portions, providing an opening through each of said end portions of said other flange, positioning one of said wireways so that said other flange thereof is adjacent one of said downcomers and so that each of said openings in said end portions thereof is aligned with one of said openings in one of said downcomers, similarly positioning the other of said wireways adjacent said downcomers so that said openings in said end portions of said other wireway are aligned with two of said openings in said downcomers which are adjacent to said openings aligned with said first-mentioned wireway, extending fasteners through said aligned openings for attaching both of said wireways to said downcomers, and extending said relatively small electrical cable between the edges of said intermediate portion of said other flange and said first-mentioned flange of one of said wireways and said elongated portion of the other of said wireways, thereby supporting said relatively small electrical cable or the like in an arrangement with wireways having minimum spacing.

* * * * *

UNITED STATES PATENT AND TRADEMARK OFFICE
CERTIFICATE OF CORRECTION

PATENT NO.   : 5,393,020
DATED        : February 28, 1995
INVENTOR(S)  : Raymond E. Perrault, et al.

It is certified that error appears in the above-indentified patent and that said Letters Patent is hereby corrected as shown below:

Claim 8 (Column 5, line 2), delete the words "or the like";
(Column 6, line 20), delete the words "or the like".

Signed and Sealed this

Third Day of October, 1995

Attest:

BRUCE LEHMAN

Attesting Officer       Commissioner of Patents and Trademarks